No. 701,917. Patented June 10, 1902.
W. MORRISON.
SECONDARY BATTERY.
(Application filed June 18, 1900.)
(No Model.) 3 Sheets—Sheet 1.
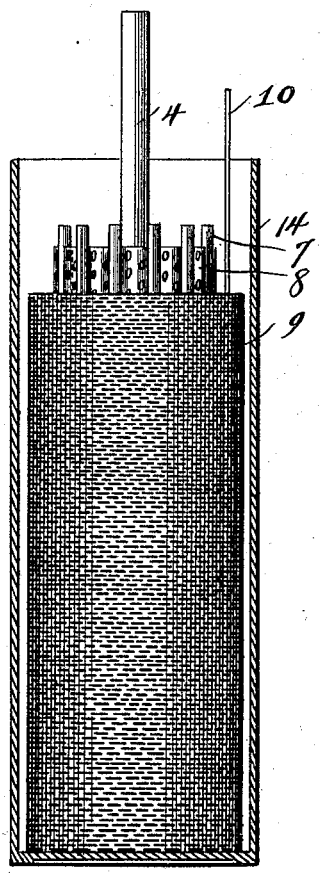
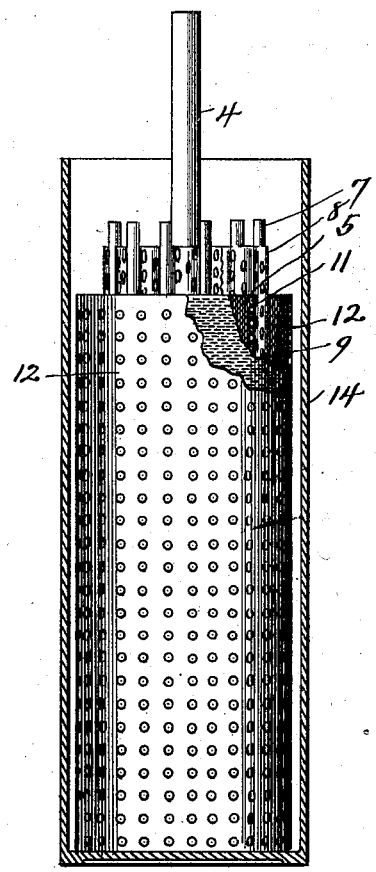
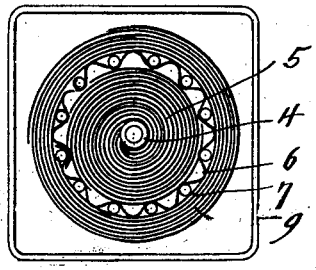
Witnesses,
Inventor,
William Morrison
By Offield, Towle & Linthicum
Attys.

No. 701,917. Patented June 10, 1902.
W. MORRISON.
SECONDARY BATTERY.
(Application filed June 18, 1900.)

(No Model.) 3 Sheets—Sheet 2.

Witnesses. Inventor,
William Morrison
By Offield Towle & Linthicum
Atty's.

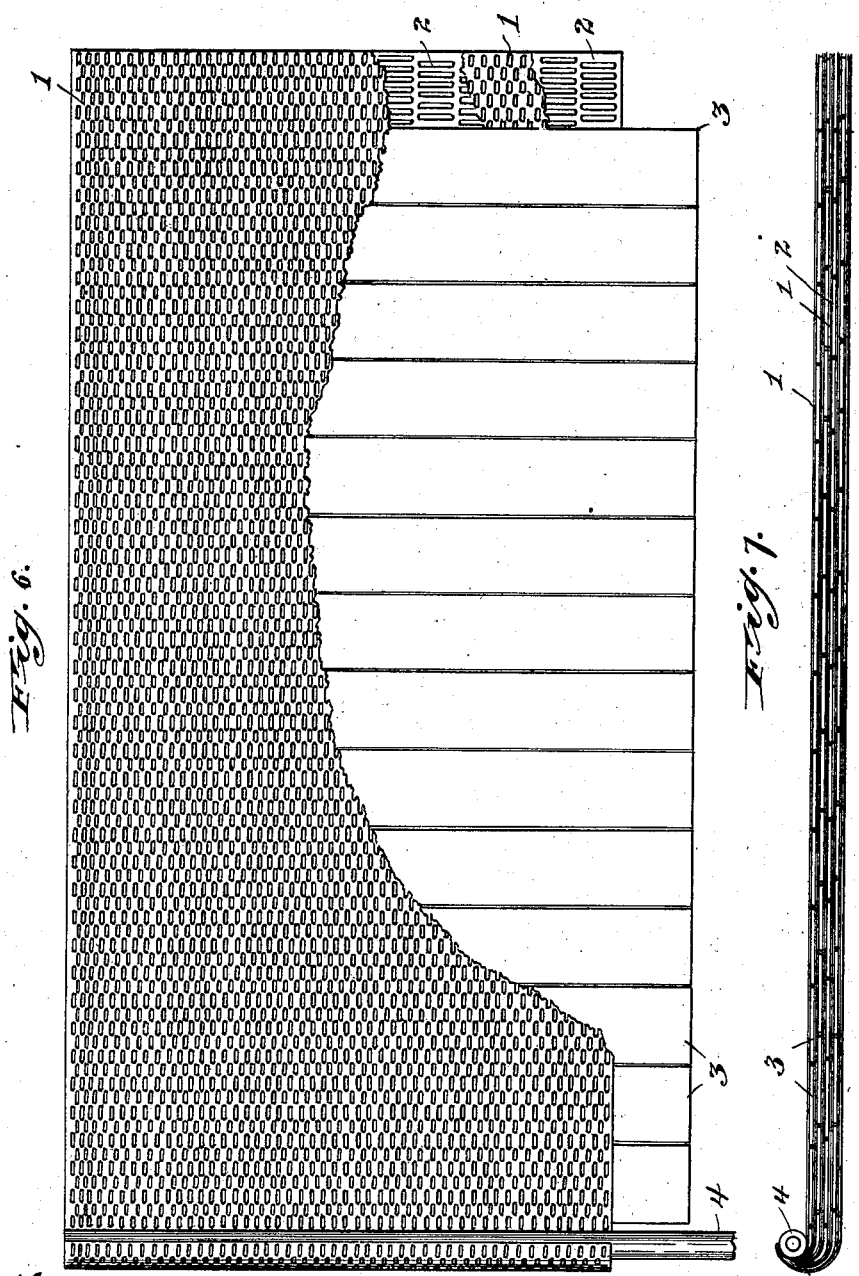

UNITED STATES PATENT OFFICE.

WILLIAM MORRISON, OF CHICAGO, ILLINOIS, ASSIGNOR TO THE HELIOS-UPTON COMPANY, OF CHICAGO, ILLINOIS, A CORPORATION OF NEW JERSEY.

SECONDARY BATTERY.

SPECIFICATION forming part of Letters Patent No. 701,917, dated June 10, 1902.

Application filed June 18, 1900. Serial No. 20,657. (No model.)

*To all whom it may concern:*

Be it known that I, WILLIAM MORRISON, a citizen of the United States, residing at Chicago, in the county of Cook and State of Illinois, have invented certain new and useful Improvements in Secondary Batteries, of which the following is a specification.

This invention relates to secondary batteries, and more particularly to that class known as the "Planté" type, and has for its object to provide a battery or battery element which shall have a maximum capacity in proportion to its weight. In batteries of this type as heretofore constructed the elements have been composed, as a rule, of sheets or plates of lead and only the surface portions thereof constitute the active material, the central or body portion acting only as a support and being of considerable bulk and weight. This adds considerably to the weight of the battery without in any way increasing its capacity; and it is the object of my present invention to obviate this objection and to produce a battery element the capacity of which shall be greatly increased in proportion to its weight.

To this and other ends my present invention consists in certain novel features which I will now proceed to describe and will then particularly point out in the claims.

Figure 4:
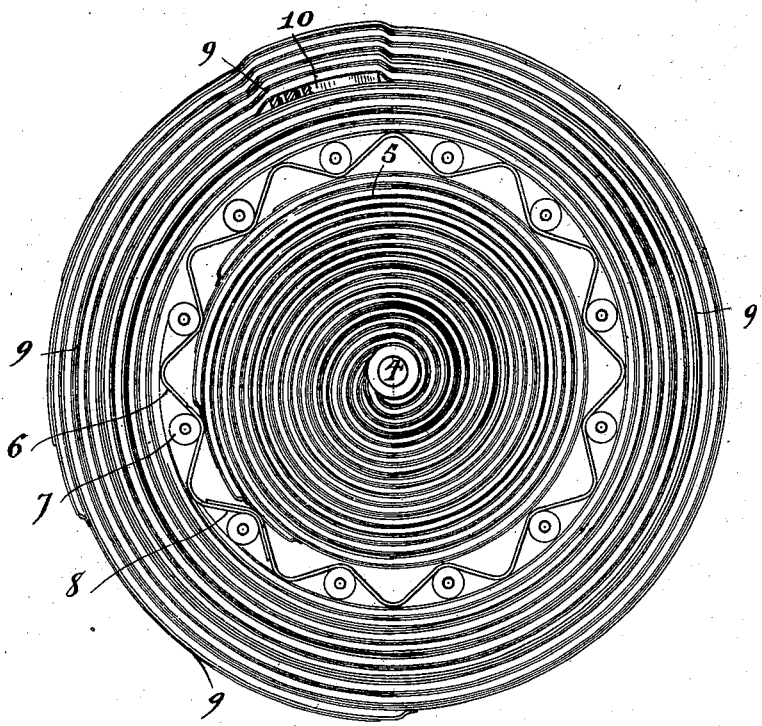
Figure 5:
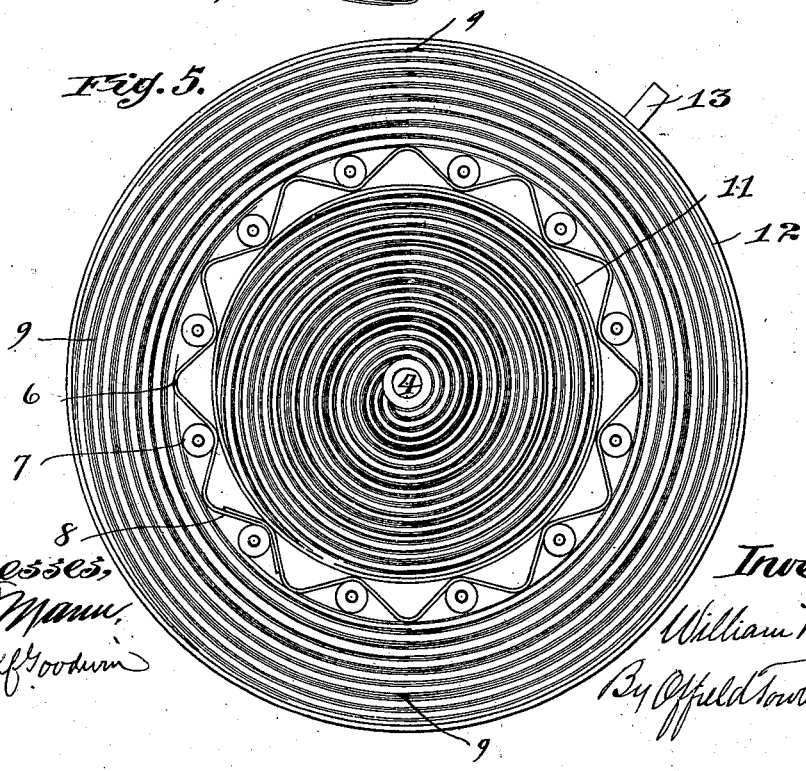

In the accompanying drawings, Figure 1 is a view of a battery embodying my invention in one form, the cell being in section. Fig. 2 is a similar view of a modified form, partially broken away to show the internal construction. Fig. 3 is a plan view of the construction shown in Fig. 1. Fig. 4 is an enlarged plan view of the elements of the battery shown in Fig. 1. Fig. 5 is a similar view of the elements of the battery shown in Fig. 2. Fig. 6 is a view illustrating the process of constructing a battery element, and Fig. 7 is an edge view of the structure shown in Fig. 6.

In carrying out my invention I propose to construct each battery element of a plurality of sheets of lead-leaf or lead-foil, the same being extremely thin, and flexible sheets of lead. These sheets are perforated or provided with a plurality of apertures of such size and number that the battery fluid or fluid in the forming-cell may pass freely through the body of the element composed of these apertured sheets. In constructing a battery element according to the preferred form of my invention I roll up a number of these sheets of lead-foil or lead-leaf in spiral form, and as a preliminary step I arrange the sheets in pairs, as shown more particularly in Figs. 6 and 7. In said figures I have indicated the sheets of lead-foil by the reference-numerals 1 and 2, and it will be observed that these sheets are superposed in pairs, each pair consisting of a sheet 1, which has comparatively short perforations running longitudinally of the sheet, and a sheet 2, wherein the perforations are arranged to run transversely of the sheet or, in other words, at right angles to the perforations on the sheet 1, which is the other sheet of the pair. The perforations of the sheet 2 are of sufficient length to extend across at least two of the perforations of the other sheet, and preferably they are such a length as to extend across three of the smaller perforations, as shown. Between each pair of sheets I place a suitable flexible separating device, and in the construction shown in Figs. 6 and 7 this separating device consists of a plurality of flat strips 3 of hard rubber or any other suitable material. After a sufficient number of pairs of sheets have been placed one above the other and separated as described the entire structure is rolled spirally, so as to form a substantially cylindrical body. For this purpose I prefer to employ a tube or rod 4 of lead, to which the edges of the sheets at one end of the body of the material are suitably joined—as, for instance, by "burning" them on or soldering. When this connection has been effected, it is obvious that by burning the rod or tube 4 and rolling it over the body of the structure the whole will be formed into a spiral or cylindrical form. The arrangement in pairs does not necessarily require to be followed throughout the entire structure, and in the actual construction shown the last sheet of lead-foil is a single one. The sheets may be entirely separate or they may be united in pairs, in which case the pile will be constructed by making the sheets of twice the length of the pile and folding them centrally. After the sheets have been rolled up into cylinder form the separating devices are withdrawn, and the central or inner element is then completed by suitably securing the free ends of the sheet, preferably by burning them onto the body of the sheets which they overlie. This union may be effected before the withdrawal of the separating devices. The inner element as thus constructed I have designated as a whole by the reference-numeral 5. Around the body of the inner element is wrapped an expansible or yielding sheet of non-conducting material, and this consists in its preferred form of a corrugated sheet of hard rubber 6, apertured to permit the free passage of the liquid. This structure is of such a nature that as the bodies of the battery elements increase in size during the forming process the corrugations will be somewhat flattened out, and the insulating-sheet will thus accommodate itself to the said increase in size. In order to prevent the sheet from collapsing when the battery becomes heated, I prefer to insert in the spaces formed by the corrugations of the insulator rods or tubes 7, preferably constructed of hard rubber and serving to effectually prevent such a crushing of the perforated insulating-sheet as would permit the short-circuit of the battery. The ends of the sheet are overlapped, as indicated at 8, and are held in position by that one of the rods 7 which lies within the corrugation where the overlapping occurs. I have shown the rods as located in the spaces between the outer battery element and the corrugated sheets; but they may obviously be located in the spaces between the inner battery element and said sheet. The outer battery element is then constructed by winding or rolling a plurality of sheets of lead leaf or foil around the central body already formed as a core. These sheets will be built up in a pile in the manner already described in connection with the inner battery element, and suitable separating devices will be employed to separate the pairs of sheets. The free edges of these sheets are secured in any suitable manner, as by burning them to the body of the element, and the outer battery element, which is indicated at 9, is thus constituted. The rod or tube 4 constitutes a terminal for the inner battery element, and a suitable terminal for the outer battery element may be obtained by inserting between the component sheets thereof during the process of winding a flat strip 10 of suitable conducting metal, which extends upward above the body of the structure, as indicated in Fig. 1. This strip is located about centrally between the inner and outer surface of the element and may be united to the adjacent lead sheets by burning or in any other suitable manner. The said strip, or at least that portion thereof which lies below the top of the element, is suitably perforated, so as to permit free passage of the battery fluid.

If desired, each element of the battery may be inclosed in a suitable tubular casing, the casing for the inner element being indicated at 11 and that of the outer element at 12. These casings are preferably constructed of lead in the shape of a pipe and being subsequently perforated or apertured to permit the free passage of the battery fluid. The elements inclosed within the casing will by reason of their expansion during the forming process be caused to firmly fit within and completely fill the casing and will thus be protected from injury. When the particular construction just referred to is employed, I prefer to provide the terminal of the outer element of the battery by forming the same integrally upon the external surface of the casing 12, and this can be readily accomplished when the casing is made, as lead pipes are usually made by forcing the lead through a die and by imparting to the die a conformation suitable to form on the exterior of the tube a rib, of which the lower and superflous portion may subsequently be cut away in any desired manner. After the battery elements have been made into the form shown and the spacing devices have been removed from between the sheets of lead-foil the elements are placed within a cell 14, containing a suitable acid-bath, and a current of electricity is passed through the elements in the usual manner employed in the forming of such batteries, whereby the lead-foil of which the elements are composed becomes converted into active material. By reason of the fact that the acid-bath has free access to practically all of the exposed surfaces and all of the sheets of lead-foil the conversion of the same into acid material is practically complete and the percentage of inert material which exists in lead plates as heretofore employed is practically eliminated. In this way the capacity of the battery in proportion to its weight is very greatly increased and in fact almost doubled.

Although I have described as an illustration of my invention a structure embodying the same in one form and with certain modifications, yet I do not wish to be understood as limiting myself to the details of construction set forth, as it is obvious that they may be varied without departing from the principle of my invention.

I claim—

1. An element for secondary batteries formed by electrochemical action from a plurality of flat sheets of lead leaf or foil, said sheets being arranged in pairs in juxtaposition and having elongated apertures, the apertures of one leaf or sheet of each pair extending transversely across the apertures of the other leaf of said pair, substantially as described.

2. An element for secondary batteries, composed of a plurality of sheets of lead leaf or foil arranged in pairs, one sheet of each pair having comparatively short apertures and the other leaf of said pair having long apertures arranged to cross two or more of the apertures of the first-mentioned leaf, substantially as described.

3. A secondary-battery element composed of a plurality of perforated sheets of lead leaf or foil, having elastic material interposed between each pair of adjacent sheets, and rolled into spiral form, said element as a whole having the form of a relatively long cylindric body, whereby access of an electrolyte to the main portion of the element, is had through the perforations chiefly, and expansion incident to forming is provided for.

4. In a secondary battery, the combination, with an inner element composed of a plurality of sheets of lead leaf or foil rolled into spiral shape, of a similarly-composed outer element, inclosing said first element and an expansible insulating material located between the two elements, substantially as described.

5. The combination, with an inner element composed of a plurality of perforated sheets of lead leaf or foil rolled into spiral form, of a similarly-composed outer element, inclosing said first element and a perforated sheet of insulating material located between said elements, substantially as described.

6. The combination, with the inner and outer elements composed of a plurality of sheets of lead leaf or foil spirally wound, of a corrugated sheet of insulating material interposed between the two, and rods or tubes of insulating material inserted in the corrugations, substantially as described.

7. In a battery of the character described, the combination with an element having a body portion composed of a plurality of perforated sheets of lead-leaf, rolled into spiral form, of an inclosing casing consisting of a circumferentially integral and uninterrupted tube of lead having terminal projection formed integral therewith, substantially as described.

8. A battery element consisting of a plurality of pairs of sheets of lead or foil wound spirally around each other, the members of each pair of sheets being arranged in juxtaposition and annular spaces being provided between each pair of a width greater than the thickness of single sheets, as and for the purpose set forth.

9. A battery element comprising a plurality of sheets of lead leaf or foil, formed spirally around each other, each pair of leaves consisting of flat perforated leaves arranged in juxtaposition to each other and annular spaces arranged between each adjacent pair of leaves, whereby the leaves of each pair are in contact with each other, but are free from contact with the leaves of adjacent pairs, substantially as described.

WILLIAM MORRISON.

Witnesses:
IRVINE MILLER,
ADA H. BARNES.